June 28, 1932.    O. H. REEVES    1,864,934
DERRICK SCAFFOLD
Filed Nov. 23, 1927    6 Sheets-Sheet 1

Inventor:
Oliver H. Reeves,
by Emery, Booth, Janney & Varney.
Att'ys.

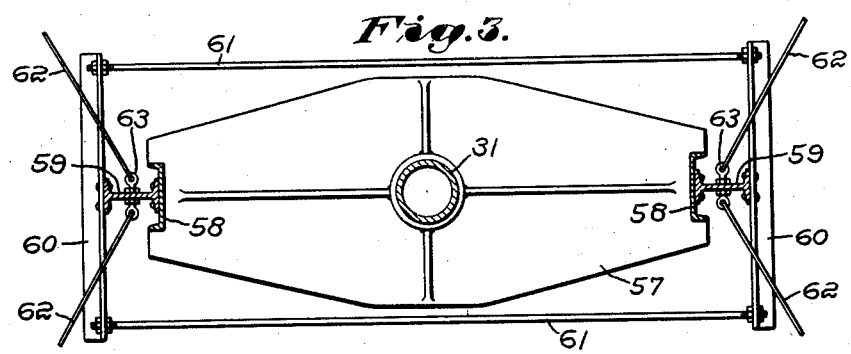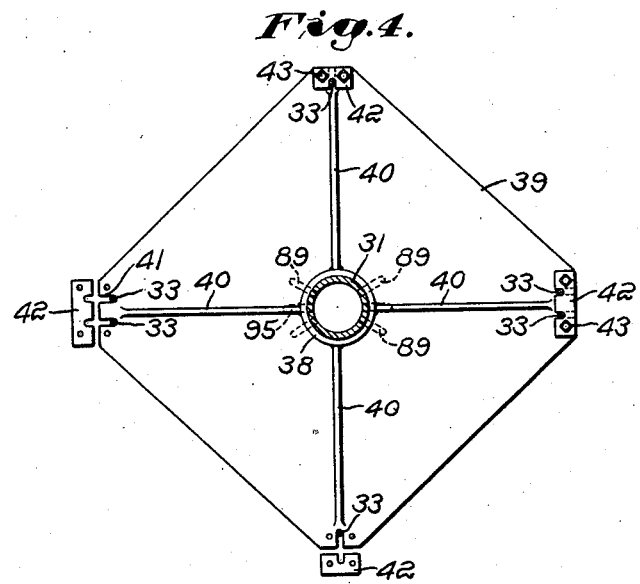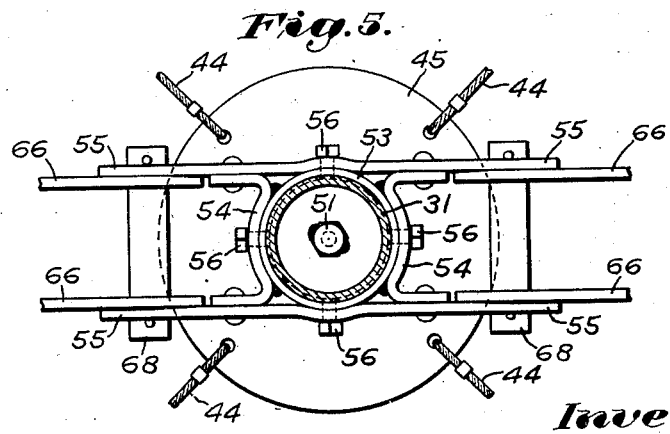

June 28, 1932.    O. H. REEVES    1,864,934
DERRICK SCAFFOLD
Filed Nov. 23, 1927    6 Sheets-Sheet 3
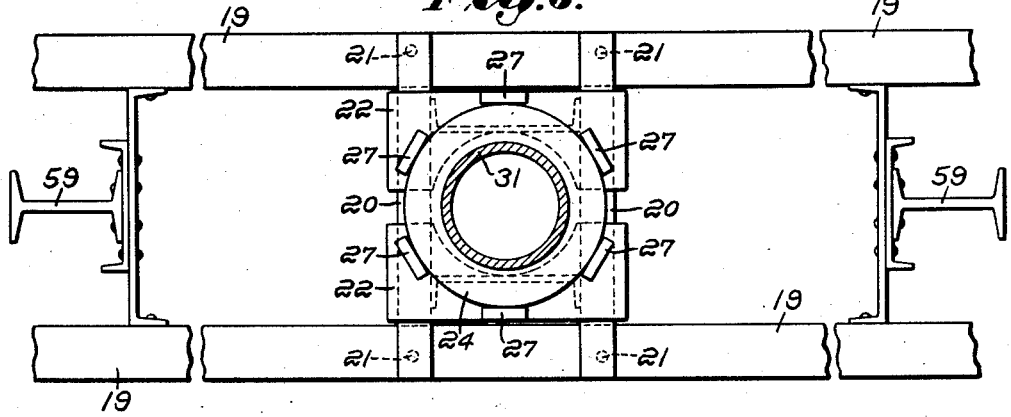
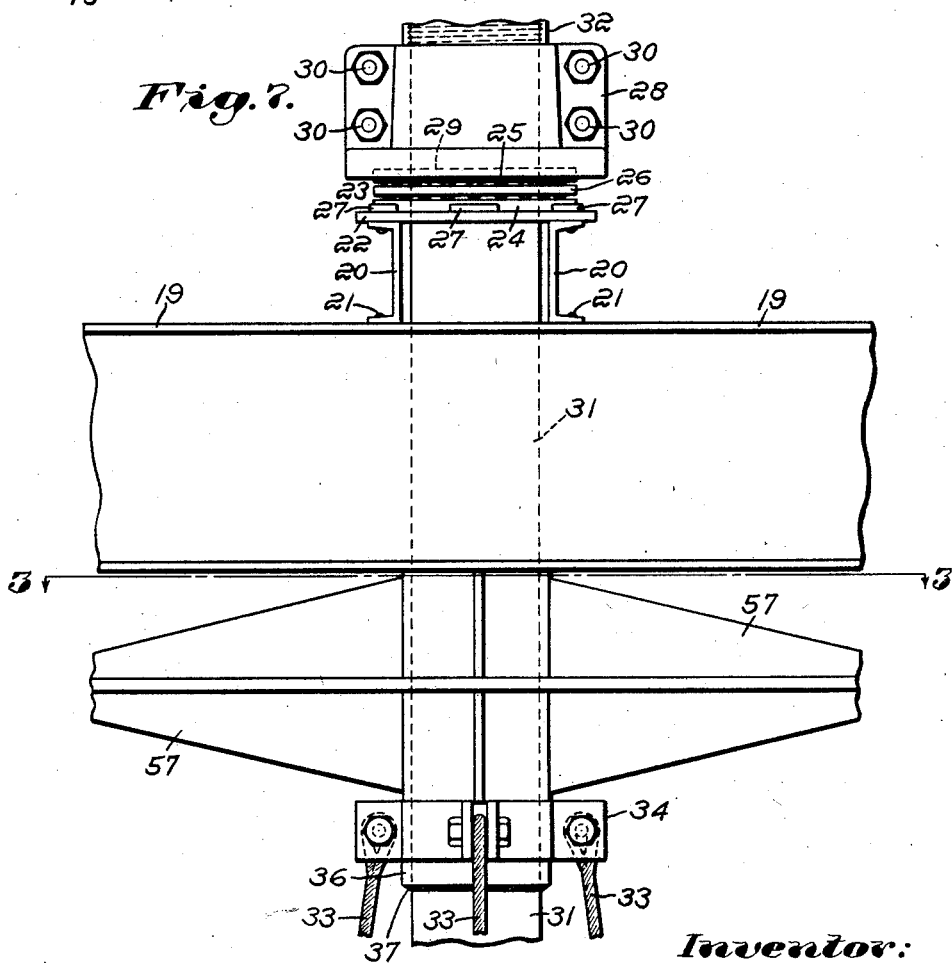
Inventor:
Oliver H. Reeves,
by Emery, Booth, Janney & Varney
Att'ys.

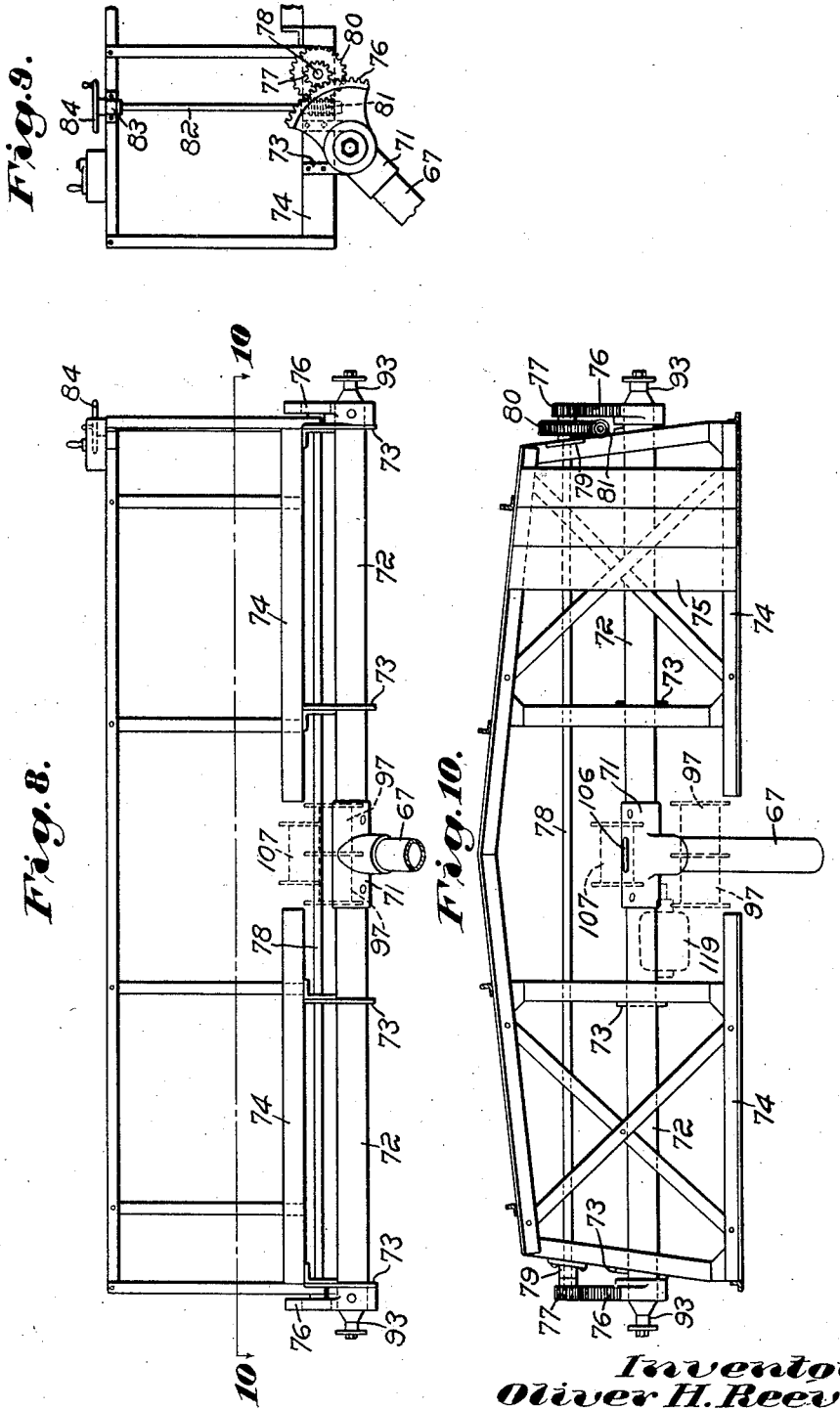

June 28, 1932.　　O. H. REEVES　　1,864,934
DERRICK SCAFFOLD
Filed Nov. 23, 1927　　6 Sheets-Sheet 5
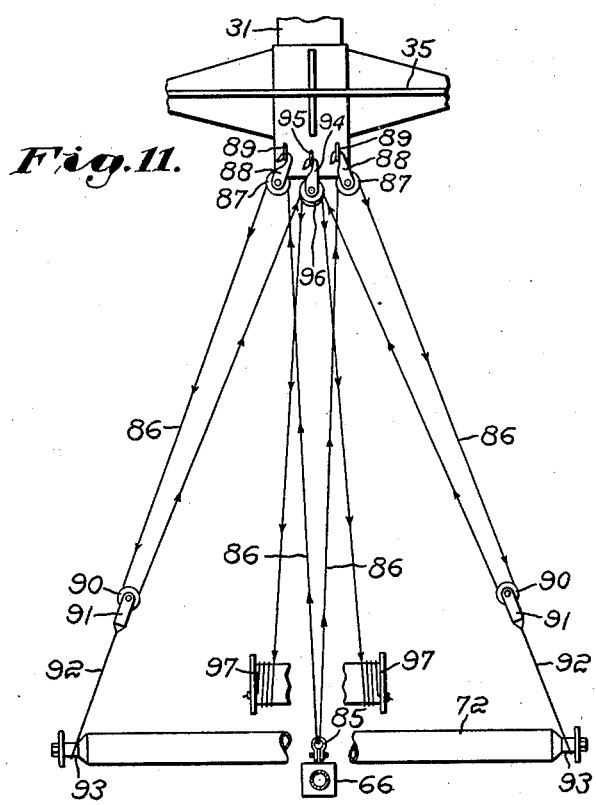
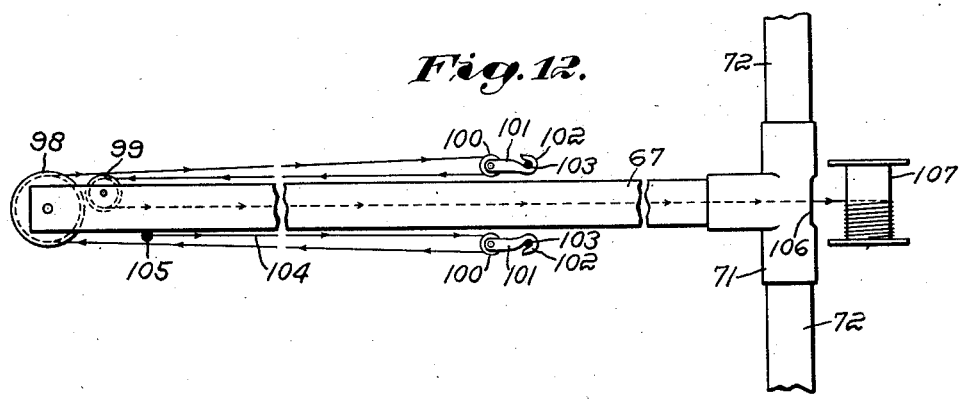
Inventor:
Oliver H. Reeves,
by Emery, Booth, Janney & Varney.
Att'ys.

June 28, 1932.  O. H. REEVES  1,864,934
DERRICK SCAFFOLD
Filed Nov. 23, 1927  6 Sheets-Sheet 6
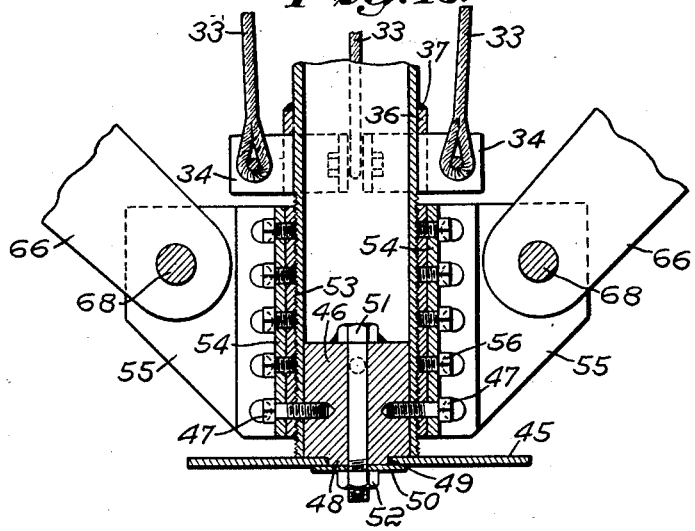
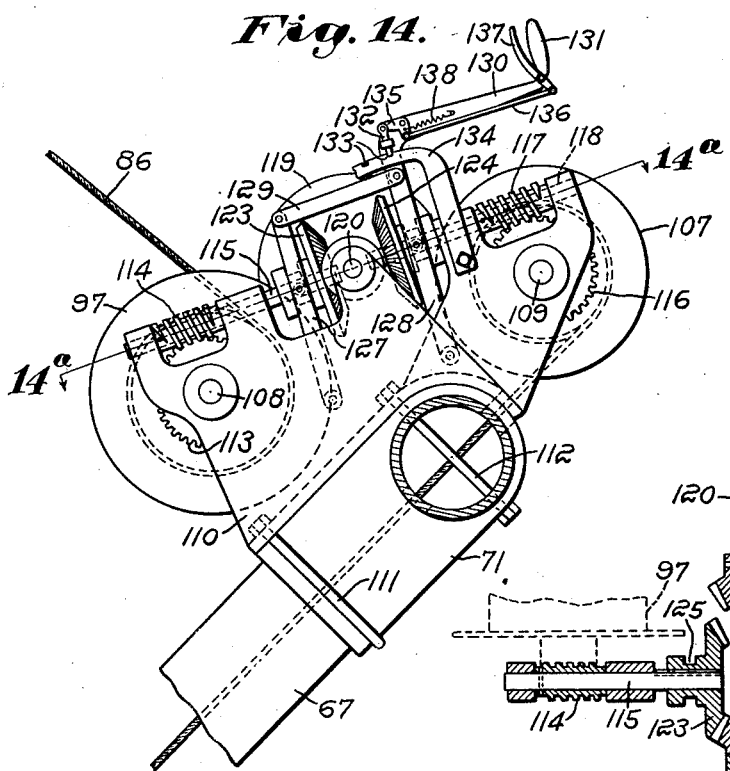
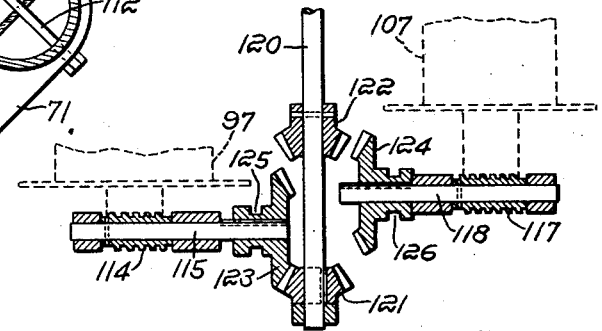
Inventor:
Oliver H. Reeves,
by Emery, Booth, Janney & Varney,
Att'ys.

Patented June 28, 1932

1,864,934

UNITED STATES PATENT OFFICE

OLIVER H. REEVES, OF JAMAICA PLAIN, MASSACHUSETTS

DERRICK SCAFFOLD

Application filed November 23, 1927. Serial No. 235,376.

This invention relates to a novel, suspended, derrick scaffold, for use in connection with cleaning, painting and other operations, either in connection with original construction or subsequent maintenance work within building structures, such as auditoriums, and in other situations where the erection of an ordinary scaffold is undesirable, inconvenient or impracticable.

The invention will be best understood by reference to the following description, when taken in connection with the accompanying drawings of one specific embodiment thereof, while its scope will be more particularly pointed out in the appended claims.

In the drawings:

Fig. 3 is a sectional view, on an enlarged scale, on line 3—3 of Figs. 1 and 7;

Fig. 4 is a sectional view, on an enlarged scale, on line 4—4 of Fig. 1;

Fig. 5 is a sectional view, on an enlarged scale, on line 5—5 of Fig. 1;

Fig. 6 is a sectional view, on an enlarged scale, on line 6—6 of Fig. 1;

Fig. 7 is an elevation of a portion of the superstructure of the derrick scaffold, including the mast bearing from which the mast is suspended;

Fig. 8 is a side elevation of a work platform, or car, which is carried by the boom, and which in turn carries the motor and the controls for raising and lowering, and elongating and shortening the boom, and for elevating the platform;

Fig. 9 is an end elevation of the parts shown in Fig. 8;

Fig. 10 is a sectional view, on line 10—10 of Fig. 8;

Fig. 11 is an elevation illustrating the arrangement of the cables and drum for raising the boom;

Fig. 12 is a plan illustrating the arrangement of the cable for elongating the boom;

Fig. 13 is a vertical, sectional view of the lower portion of the mast and adjacent parts;

Fig. 14 is an elevation of the driving mechanism for raising and lowering, and for elongating the boom; and Fig. 14a is a sectional view, on line 14a—14a of Fig. 14.

Figure 1:
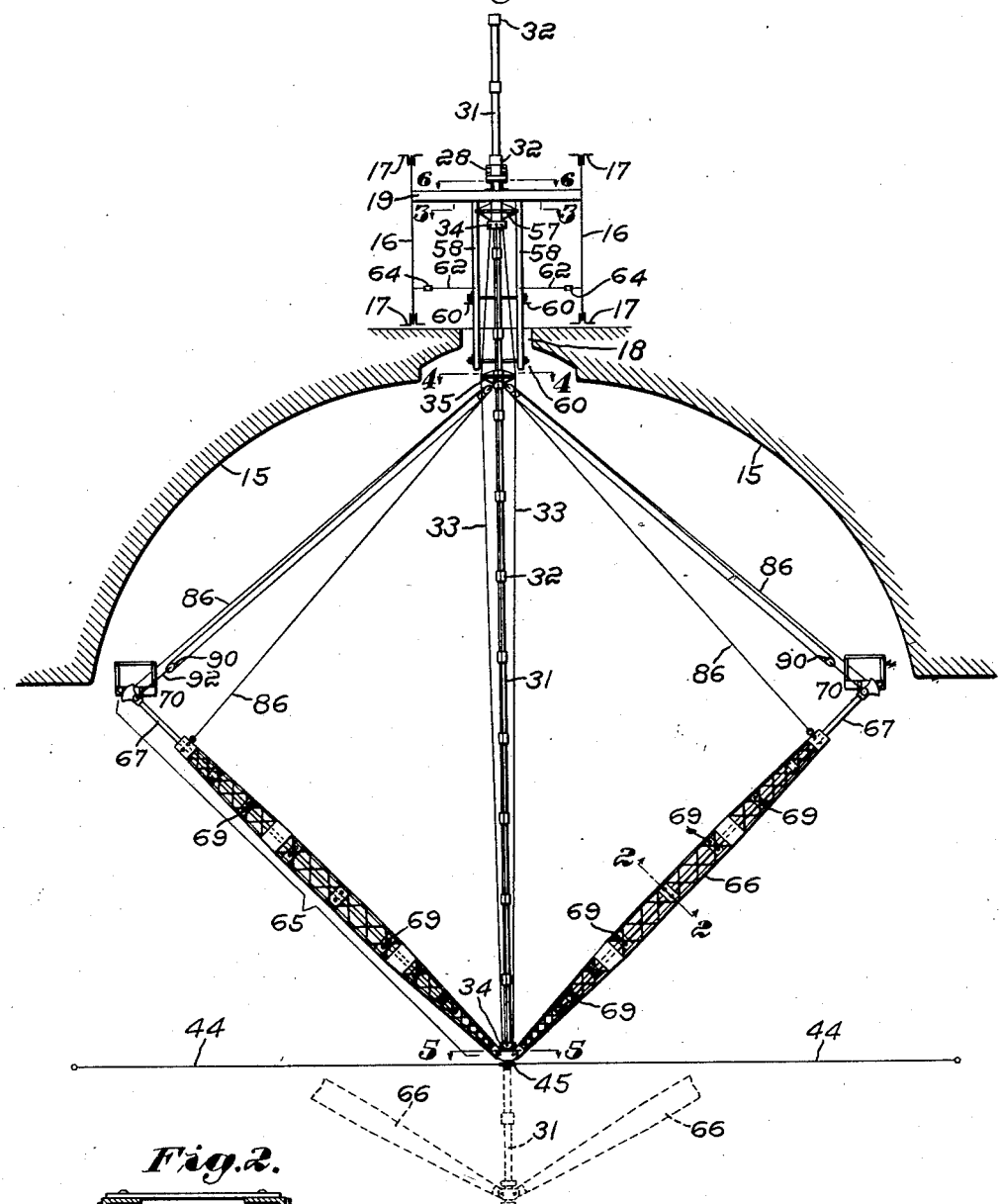
Fig. 1 is an elevation of a derrick scaffold exemplifying the invention, showing the same as used within a dome.

Referring to the drawings, and to the embodiment of the invention which is selected for exemplification, and having reference at first to Fig. 1, there is shown in a conventional manner a portion of a building structure comprising a dome 15, which is the inner dome of the building structure, it being understood of course that there is usually provided an outer dome, not herein shown, between which and the inner dome, there is a considerable space devoted to structural steel work. By way of example, a portion of the structural work is shown in Fig. 1, the same comprising vertical members 16 and upper and lower horizontal members 17. The lower dome 15 is provided with an opening 18, which leads to the space thereabove. Removal of the grille work or other usual covering for this opening affords an opportunity for suspending the mast of the derrick scaffold from a scaffold superstructure, supported by the permanent, structural steel work of the dome.

The derrick scaffold superstructure herein shown comprises a pair of horizontal members, such as channel bars 19, whose ends are appropriately secured to and supported by the vertical members or uprights 16. Referring now to Fig. 6, the channel bars 19 are surmounted by short horizontal cross members, herein channel bars 20, suitably secured thereto as by rivets 21. These bars, in turn, are surmounted by plates 22, which afford support for an anti-friction bearing 23 (see Fig. 7) for the mast presently to be described, said bearing herein comprising upper and lower races 24, rolling members, herein balls 25, and a cage or ring 26 for said balls. Lateral displacement of the bearing is prevented by appropriate means, herein lugs 27, projecting upwardly from the plates 22, and encompassing the lower race 24. Above the bearing is a collar 28, resting upon the upper race 24, and held against lateral displacement with relation thereto, as by providing the under side of said collar with a recess 29, which receives said race. In the present example, the collar is made in two parts, secured together by bolts 30. This collar is secured in place about the mast now to be described.

Referring now to Fig. 1, the mast herein shown is sectional, it being composed of a series of sections 31, conveniently pieces of pipe or tubing appropriately secured together, as by pipe couplings 32, internally threaded to receive the externally threaded ends of the pipe sections (see Fig. 7). Referring to the upper portion of Fig. 1, the collar 28 is placed immediately below one of these couplings, which therefore rests upon the collar. Therefore, clamping action of the collar about the mast is not depended upon to prevent the mast from sliding in a downward direction through the collar and the supporting bearing. By first attaching a tackle to the mast, and then removing the collar, the mast may be raised or lowered, and the collar replaced in a new position.

Light weight of the mast, of course, is desirable, yet it must not flex. This result is conveniently achieved by providing the mast with stays 33, secured at their upper and lower ends to anchor rings 34, and spread apart between these rings by a spreader 35 (see Fig. 1). Referring to Fig. 7, downward displacement of the upper anchor ring is prevented by appropriate means, herein a collar 36, suitably secured as by welding at 37 to the mast, and the lower anchor ring is similarly held against upward displacement by a like ring 36 (see Fig. 13), welded as at 37 to the mast.

The spreader will now be described, reference being had to Fig. 4. Herein, the spreader is conveniently in the form of a casting presenting a collar 38, having a horizontal web 39 provided with strengthening ribs 40, the web having a generally rectangular form, as viewed in plan. In each corner, the web is provided with one or more open-ended slots 41, to receive the stays 33. Plates 42, suitably secured as by bolts 43 to the web, prevent outward displacement of the stays in their respective slots. Inasmuch as there is a greater tendency of the mast to flex in the plane of the booms presently to be described than in a plane perpendicular thereto, a greater number of stays has been provided to prevent flexing of the mast in the plane of the booms. As shown in Fig. 4, there are two diagonally opposite corners, at each of which there are two stays close together, while at each of the remaining two corners, there is but one stay.

Referring to Fig. 1, lateral movement of the lower end of the mast is prevented by guy wires 44, herein four in number, whose outer ends are anchored at suitable points to the building structure. The inner ends of these wires are secured to a plate 45, to which the lower end of the mast is pivoted to turn about a vertical axis (see Fig. 13), as by the provision of a plug 46, inserted in the lower end of the mast, and secured thereto as by cap-screws 47, said plug having a reduced portion 48 received in a bearing 49 presented by the plate. The plate is conveniently held in place by a washer 50 and a bolt 51 having a nut 52.

About the lower end of the mast is a sleeve 53, appropriately secured thereto as by having screw-threaded engagement therewith. About this sleeve is a collar 54 presenting ears 55 for the attachment of one or more booms presently to be described. This collar is conveniently secured to the sleeve by several cap-screws 56, which extend through the collar and through the sleeve. The cap-screws 47, which secure the plug 46 in place, extend through the collar and through the sleeve, and thus further secure these parts to the mast.

In the present example, means are provided for vertical adjustment of the mast to increase the working range of the derrick scaffold, by lowering the mast from the position shown in full lines in Fig. 1 to some such position as that shown in dotted lines therein. This is conveniently accomplished by the provision of a cross-head 57, loosely mounted on and about the mast above the upper anchor collar 34, and having sliding engagement with vertical guides (see Fig. 3), herein channel bars 58 secured to vertical bars, herein I-beams 59, whose upper ends are appropriately secured to the horizontal members 19 of the superstructure (see Fig. 1). These I-beams in turn are secured to horizontal members, herein angle bars 60, which are connected to each other, as by tie-rods 61. In this way, the proper spacing between the cross-head guides 58 is maintained. Lateral swaying of the guides is conveniently prevented by four diagonal guy-wires 62, secured to the I-beams 59, as by eye-bolts 63, while the outer ends of the guy-wires are secured in like manner (see Fig. 1) to the vertical members 16 of the building structure. Turnbuckles 64 provide an appropriate means of adjustment for the guy-wires to keep them taut.

Figure 2:
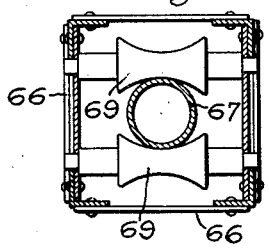
Fig. 2 is a sectional view, on an enlarged scale, on line 2—2 of Fig. 1.

The mast supports one or more, herein two, booms, one of which will now be described, reference being had at first to Fig. 1. In the present embodiment, the boom, designated generally by the numeral 65, is extensible, it being composed of two sections 66 and 67, which are telescopically arranged. The section 66 herein is of latticed, structural steel construction, and its lower end (see Fig. 13) is mounted on a pivot 68, extending through one pair of the ears 55. Referring now to Fig. 2, the boom section 67, in the present instance, is a cylindrical tube, mounted in appropriate guides, herein between pairs of guide rollers 69 within the latticed section 66.

The section 67 supports a work platform, or car, 70, which will now be described, reference being had to Figs. 8, 9 and 10. To the outer ends of the boom section 67, there is secured, as by means of a T-fitting 71, a cross member, herein a tube 72, which is received in bearing brackets 73 secured to a horizontal framework 74, the latter supporting a flooring 75, a portion of which is shown in Fig. 10. This provides a platform for one or more workmen.

Angular relationship between the platform and the boom is controlled by appropriate mechanism, such as that now to be described, reference being had to Figs. 9 and 10. Segmental gears 76, secured to the ends of the tubular support 72, mesh with pinions 77 secured to the ends of a shaft 78, which, as shown in Fig. 10, is mounted in bearings 79 on the ends of the framework. There is also secured to this shaft a worm gear 80, which meshes with a worm 81, the latter being secured to a vertical shaft 82, mounted in bearings 83 and provided with a hand-wheel 84. The platform can be leveled by turning the hand-wheel the required amount, and the worm and worm gear lock the platform in the desired position.

The boom can be raised and lowered on its pivot by mechanism such as that now to be described, reference being had at first to Fig. 11. Secured to the latticed section of the boom is a shackle 85, to which the ends of two wire ropes, or cables, 86 are attached. These ropes lead upward to and part way about sheaves 87 of blocks 88, which are hung on eye-bolts 89, secured to the hub of the spreader 35. The ropes lead thence in downward and outward direction, to and part way about sheaves 90 of blocks 91, which are suitably secured, as by bridle ropes or wires 92, to reduced portions 93 of the supporting bar 72. Between the blocks 88, there is a block 94, hung on an eye-bolt 95, and having two sheaves 96. The wire ropes 86, after passing part way about the sheaves 90, lead upward, part way about the sheaves 96, and thence downward to and about drums 97, to which the remaining ends of the wire ropes are secured. These drums are secured together, and rotate as one. Thus it is evident that, by rotating the drums, the ropes are wound in and paid out in unison, and the boom is raised or lowered, as the case may be. Rotation of the drums is accomplished by mechanism presently to be described.

The mechanism for extending or elongating the boom will now be described, reference being had to Fig. 12. Carried by the tubular section 67 adjacent its inner end are two sheaves 98 and 99. Mounted on the latticed section 66 are two sheaves 100, carried by blocks 101 presenting hooks 102 secured to pins 103 on said boom section. The wire rope or cable 104 is secured at one end to an eye-bolt 105 on the boom section 67, and leads thence in an outward direction to and part way about one sheave 100, thence inward to and part way about the sheave 98, thence outward to and part way about the second sheave 100, thence to and part way about the sheave 99, thence through the interior of the boom section 67, and out through an opening 106 in the T-fitting 71 to and about a drum 107, to which the remaining end of the rope is secured. Thus it is evident that, by rotating the drum in the proper direction to wind the rope thereon, the boom section 67 will be drawn in an outward direction with relation to the boom section 66. By simply unwinding the rope, the boom section 67 is allowed to gravitate inward.

The mechanism for driving the rope-winding drums will now be described, reference being had to Fig. 14. The drums 97 and 107 are mounted on shafts 108 and 109, respectively, in a frame 110, which is suitably secured as by bolts 111 and 112 to the T-fitting 71. Secured to the shaft 108 is a worm gear 113, meshing with a worm 114, which is secured to a shaft 115 mounted in bearings presented by the frame 110. In like manner, there is secured to the shaft 109 a worm gear 116, meshing with a worm 117, which is secured to a shaft 118, mounted in bearings presented by the frame. The frame also supports a reversible, electric motor 119, having a shaft 120 likewise mounted in bearings presented by the frame.

Referring to Fig. 14a, appropriate means are provided for coupling the motor shaft to either worm shaft at will, and in such manner as to drive either worm in either direction. This is conveniently accomplished in the present example by securing to the motor shaft two bevel pinions 121 and 122, one of which may be meshed with a bevel gear 123 splined on the shaft 115, while the other may be meshed with a bevel gear 124 splined on the shaft 118. Suitable means are provided for moving one bevel gear into mesh with its associated pinion, and simultaneously moving the other bevel gear out of mesh with its associated pinion. To this end, the hubs of the bevel gears are provided with annular grooves 125 and 126, respectively, to receive shifter yokes, or levers, 127 and 128 (see Fig. 14), pivoted at their lower ends to the frame 110, and connected together at their upper ends by a link 129, which compels them to move in unison. The lever 128 is extended to present an arm 130, having a handle 131 by means of which the gears may be shifted.

The gear-shifting lever is conveniently locked in either positoin by a latch 132 carried thereby, and adapted to enter either of two openings 133 presented by a sector 134 secured to the frame 110. The latch is connected by a bell-crank lever 135 and link 136 to a finger lever 137 adjacent the handle 131, while an appropriately arranged spring 138 normally maintains engagement of the latch with the sector, in either position of the gear-shifting lever. The pitch of the worms and worm gears is such that they are self-locking, and the drums will not rotate, unless power is applied.

Referring now to Fig. 1, it will be seen that in the present example there are two booms oppositely placed with relation to the mast. Thus the load on the mast is practically symmetrical, particularly when both booms are placed in like positions as to angularity and elongation. This is the preferred mode of operation for general purposes, and is advantageous because little or no lateral strain is imposed on the mast. As the derrick scaffold is ordinarily used within a symmetrical building structure, the work platforms can be placed at corresponding opposite points, and the work carried out in this manner.

In practice the electric motors are supplied with current through long cables leading from the work platforms up into the dome through the opening 18 to the space above, where they are connected to a suitable source of current. A sufficient slack is provided in these cables to permit of adjustment of the booms within the limits of their range of operation. The booms are raised and lowered, and elongated and shortened, in the described manner by the motor-driven mechanisms on the platforms, and the latter can be leveled from time to time as occasion requires, to suit the angular adjustments of the booms. Rotation of the mast, carrying with it the booms about the verical axis of the mast, is conveniently accomplished by the use of a rope or ropes attached to the building structure, or by the workmen simply reaching out with their hands and pushing against the adjacent parts of the building structure.

In some cases, in addition to the main dome, there are sub-domes, or wings, laterally of and below the main dome. If the circumstances are such that they cannot be reached by merely lowering and extending the booms, the mast can be lowered in the described manner from the position shown in full lines in Fig. 1 to the position shown in dotted lines therein, thus enabling the sub-domes to be reached. When the mast is thus lowered, the cross-head, being adjacent the lower ends of its guides, affords lateral support for that portion of the mast which is above the stays, and prevents the same from flexing.

Having thus described one embodiment of the invention, but without limiting myself thereto, what I claim and desire by Letters Patent to secure is:

1. The combination with a building structure having a chamber and an opening thereabove, of a derrick scaffold, mast suspending means above said opening, a mast suspended from said suspending means, and extending downwardly through said opening into said chamber, and a work-station carried by said mast below said suspending means and within said chamber.

2. In a derrick scaffold, the combination of mast suspending means, a mast supported from said suspending means, a boom carried by said mast, a work-station carried by said boom, and means for changing the angular relationship of said boom to said mast, the last-mentioned means including an operating element carried by said work-station.

3. In a derrick scaffold, the combination of mast suspending and bearing means, a mast suspended from and rotatable about a vertical axis on said suspending and bearing means, a boom carried by said mast, a work-station pivoted on said boom to turn about a horizontal axis, means below said boom for restraining said mast from lateral movement, while permitting it to rotate about said vertical axis, and means for moving said work-station about said horizontal axis.

4. In a derrick scaffold, the combination of mast suspending and bearing means, a mast supported from and rotatable about a vertical axis on said suspending and bearing means, a boom carried by said mast below said suspending and bearing means, and means below said boom for restraining said mast from lateral movement while permitting it to rotate about said axis.

5. In a derrick scaffold, the combination of mast suspending means, a mast suspended from said suspending means, a work-station carried by said mast below said suspending means, and a plurality of guys attached to said mast below said suspending means and extending laterally in generally opposite directions.

6. In a derrick scaffold, the combination of a support, a mast supported by and depending from said support, an extensible boom carried by said mast below said support, a work-station carried by said boom adjacent its outer end, and means controllable from said work-station for extending said boom.

7. In a derrick scaffold, the combination of a support, a bearing supported thereby, a collar supported by said bearing, a mast supported by, adjustable vertically with relation to, and depending from said collar, and means including a guide below said bearing for guiding said mast.

8. In a derrick scaffold, the combination of a mast, a cross-head carried by said mast, a frame presenting vertical guides for said cross-head, and a bearing supporting said mast.

9. In a derrick scaffold, the combination of a mast, a cross-head carried by said mast, a frame presenting vertical guides for said cross-head, and a bearing supported by said frame and in turn supporting said mast.

10. In a derrick scaffold, the combination of a mast, a cross-head carried by said mast, a frame presenting vertical guides for said cross-head, and a bearing through which said mast extends vertically.

11. In a derrick scaffold, the combination of a mast, a cross-head carried by said mast, a frame presenting vertical guides for said cross-head, a bearing through which said mast extends vertically, and means providing for vertical adjustment of said mast relatively to said bearing 12. In a derrick scaffold, the combination of a mast, a cross-head carried by said mast, a frame presenting vertical guides for said cross-head, a bearing through which said mast extends vertically, and a collar secured to said mast above said bearing.

13. In a derrick scaffold, the combination of a mast, a spreader intermediate the ends of said mast, stays secured to said mast above and below said spreader and engaging said spreader, a support from which said mast depends, said support being above said spreader and said stays, and a boom carried by said mast below said stays.

14. In a derrick scaffold, the combination of a mast comprising a series of axially aligned sections, members rigidly to secure adjacent ends of said sections together, a support through which said mast extends, one of said members being above and supported by said support, and a boom carried by said mast.

15. In a derrick scaffold, the combination of a mast comprising a series of axially aligned sections, couplings which secure adjacent ends of said sections together, a support through which said mast extends, one of said couplings being above and supported by said support, and a boom carried by said mast.

16. In a derrick scaffold, the combination of a mast comprising a series of sections, couplings which secure adjacent ends of said sections together, said couplings presenting shoulders projecting laterally from said sections, a bearing about said mast below one of said shoulders, and a collar about and secured to said mast between such shoulder and said bearing.

17. In a derrick, the combination of a mast, an extensible boom carried by said mast, a work-station carried by said boom, and means carried by said work station for varying the length of said boom, said means being operable from said station.

18. In a derrick, the combination of a mast, a boom carried by said mast and comprising a plurality of sections, a work-station carried by the outermost section, and means for varying the length of said boom, said means including an operating element carried by said station.

19. In a derrick, the combination of a mast, a boom carried by said mast and comprising a plurality of sections, a work-station carried by the outermost section, and means for varying the length of said boom, said means including a cable and a cable-winding drum carried by said station.

20. In a derrick, the combination of a mast, a boom carried by said mast and comprising a plurality of sections, a work-station carried by the outermost section, and means for varying the length of said boom, said means including a cable, a cable-winding drum, and a drum rotating motor carried by said station.

21. In a derrick, the combination of a mast, a boom carried by said mast, means for varying the angular relationship of said boom to said mast, an operator's station carried by said boom, and means connecting said station to said boom and comprising an actuator carried by said station for varying the angular relationship of said station to said boom.

22. In a derrick, the combination of a mast, a boom carried by said mast, means for varying the angular relationship of said boom to said mast, an operator's station pivoted on said boom to turn relatively thereto about a horizontal axis, and means at said operator's station to control the angular relationship between said boom and said mast and between said operator's station and said boom.

23. In a derrick, the combination of a mast, a boom carried by said mast, means for varying the angular relationship of said boom to said mast, an operator's station pivoted on said boom to turn relatively thereto about a horizontal axis, and means for moving said station about said axis.

24. In a derrick, the combination of a mast, a boom carried by said mast, means for varying the angular relationship of said boom to said mast, an operator's station pivoted on said boom to turn relatively thereto about a horizontal axis, and self-locking means for moving said station about said axis.

In testimony whereof, I have signed my name to this specification.

OLIVER H. REEVES.